3,808,153
PREPARATION OF ALUMINA EXTRUDATES BY HYDROGEL EXTRUSION
Nicholas Shomitz, Gillette, N.J., and Norman Ostroff, Stamford, Conn., assignors to American Cyanamid Company, Stamford, Conn.
Continuation-in-part of abandoned application Ser. No. 872,354, Oct. 29, 1969. This application Feb. 17, 1972, Ser. No. 227,048
Int. Cl. B01j 11/06
U.S. Cl. 252—463                                10 Claims

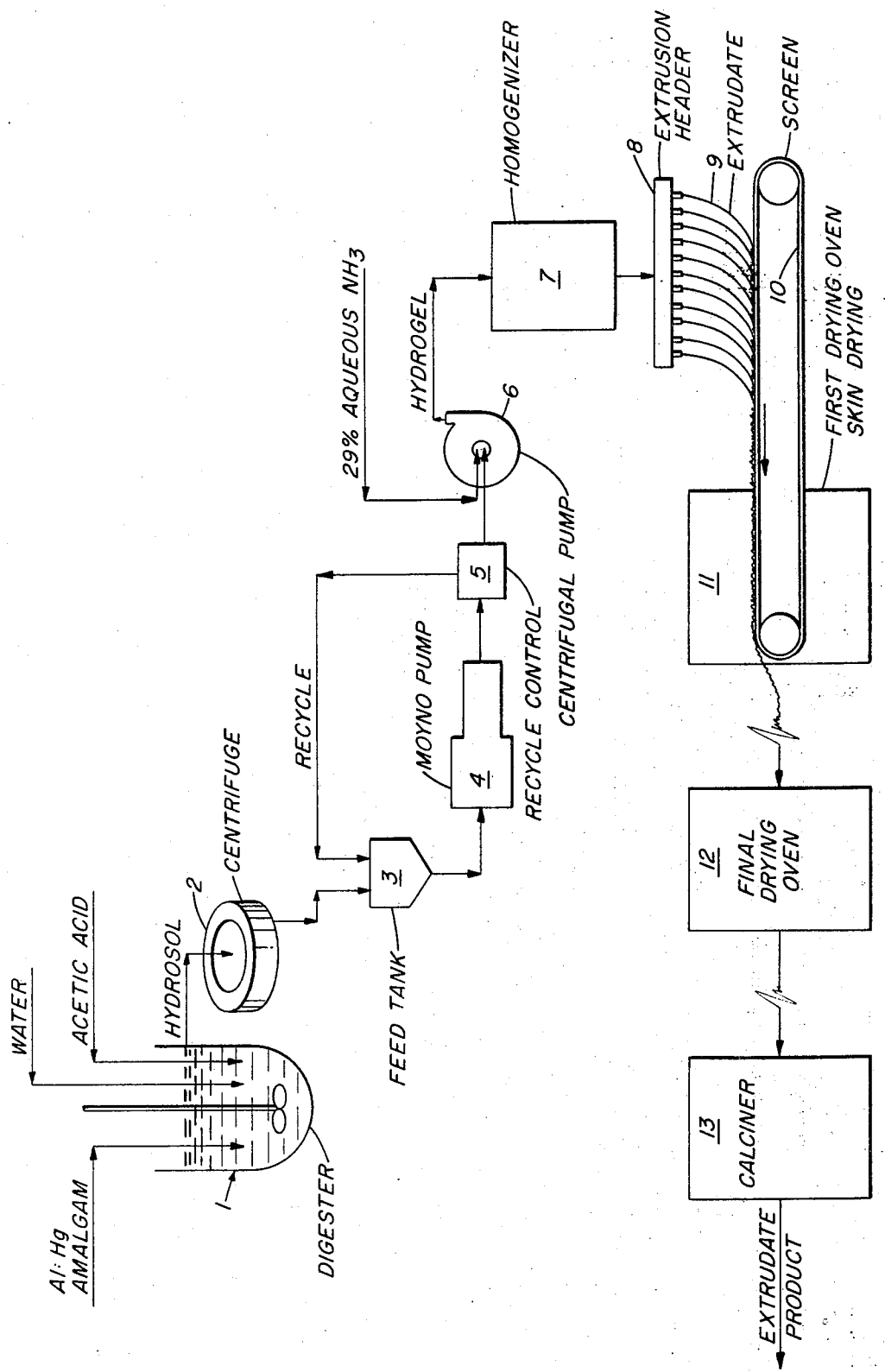

ABSTRACT OF THE DISCLOSURE

A process for the production of formed alumina catalyst material which consists of forming an alumina hydrosol of solids content in the range of 2% to 15% and pH below about 6.0, adjusting the pH of said hydrosol to at least about 7.5 to form a hydrogel, shearing the hydrogel, extruding the sheared hydrogel, and thereafter drying and calcining the extrudate.

---

This application is a continuation-in-part of application Ser. No. 872,354, filed Oct. 29, 1969, and now abandoned.

This invention relates to a process for preparing formed alumina catalyst materials. More particularly, this invention relates to a process whereby alumina extrudates useful as catalyst materials are prepared directly from alumina hydrosol in a simple manner adaptable for continuous processing.

Previously, it is known to prepare extrudates from hydrogel employing batch-type procedures. In such procedure, a hydrogel slurry of low solids is pumped to special evaporating equipment and partially dried or concentrated to a sufficiently solid consistency to be extrudable. Because of the manner by which the hydrogel is prepared, numerous washing, filtering, and reslurrying steps are necessary before partial drying in order to remove undesirable salts present. The additional step of partial drying coupled with the additional steps leading to the final dried and calcined extrudates complicate the process and restrict the nature of materials which can be effectively processed.

Other related processes for preparing hydrogel type extrudates have required partial drying and blending or dilution of the hydrogel extrusion feed to critical compositions in order to obtain extrudable compositions. Such processes also have the disadvantage of requiring extra drying, washing, blending or dilution steps which complicate the processes and make them unattractive for continuous commercial production. Moreover, the extrudates obtained by such procedures are often deficient in physical properties and may require further process steps to overcome such deficiencies, if possible.

Still other processes for preparing extrudates involves use of xerogels which result from removal of the aqueous preparative medium from hydrogels. Again, the hydrogels require extensive processing to remove salts, a necessary consequence of their preparative method, in order to be suitable for drying to xerogel state. The required step of drying is unattractive since the xerogel must be reprocessed in water and again dried to obtain the final extrudates. The additional steps required to process the xerogel into extrudates are unattractive for continuous commercial production and, in many instances, produce extrudates in which propery improvements are greatly desirable for effective use in catalytic processes. The additional steps required to effect property improvements in xerogel extrudates further complicate the proc esses and severely hamper their ability to be adapted to continuous commercial production.

A particular problem that has not been satisfactorily solved is that of processing an alumina hydrosol directly to an extrudate by a procedure which is adaptable to continuous processing. That is to say, in the prior art procedures described, there is a definite point in the processing beginning with formation of a hydrosol and ending with extrusion wherein discontinuity results. Thus, in some processes, discontinuity results at the point where hydrogel preparation is complete and subsequent processing to form an extrudate is entrely separate from initial hydrogel preparation. In other processes, discontinuity results at the point where xerogel preparation is complete and subsequent processing to form an extrudate is entirely separate from xerogel preparation. There continues to exist, therefore, the need for a simple and continuous process, useful for large scale commercial production, whereby extrudates can be obtained directly from alumina hydrosol without the need for intermediate steps of washing, drying, blending, mulling, and the like, or of intermediate isolation prior to completion of processing. Such a process would fulfill a long-felt need and provide a significant advance in the art.

In accordance with the present invention, there is provided a process for preparing catalyst material in extrudate form directly from an alumina hydrosol, which process consists essentially of the steps of: (a) preparing a colloidal suspension of alumina by reaction of aluminum with an aqueous acid, the amount of alumina in said suspension being in the range of about 2% to about 15%, by weight, based on the total weight of alumina and water, and the amount of acid present being sufficient to provide a pH below about 6.0; (b) removing unreacted aluminum and other materials which may be present so as to provide a purified hydrosol; (c) adding sufficient ammonia or ammonium hydroxide to said hydrosol to raise the pH thereof to at least about 7.5 so as to initiate gelation and form a hydrogel composition containing sufficient free water content to be too fluid for extrusion; (d) immediately subjecting the hydrogel composition to shearing action sufficient to eliminate the fluidizing effects of the free water content present and to produce a stiffened hydrogel composition, complete gelation of said hydrogel composition occurring at least prior to completion of said shearing step; (e) immediately extruding the stiffened hydrogel; and (f) thereafter drying and calcining said extrudates.

By carrying out the specified sequence of steps using the materials designated for carrying out the process of the present invention, numerous steps, such as washing, filtering, repulping, drying, blending, grinding, and mulling are eliminated and the process is readily adaptable to continuous processing since no intermediate isolation is necessary from start to completion of processing. Unexpectedly, the present process, in addition to its ability to be operated in continuous manner starting with hydrosol and its elimination of numerous required processing steps of prior procedures, provides extrudates with improved properties over prior art extrudates.

The term "catalyst material" as that term is employed is meant a material which may be used directly in catalytic processes or may form the base or carrier for promoter materials useful in catalytic processes. The promoters may be introduced into the hydrosol so as to be present in the final extrudate as formed or may be impregnated upon the extrudates after calcination thereof.

The term "hydrosol" as that term is employed herein refers to a colloidal suspension of alumina in water. The term "hydrogel" as that term is employed herein refers to a gel produced by the coagulation of a colloid with the inclusion of water. Finally, the term "xerogel" as that term is employed herein refers to a gel containing little or none of the dispersion medium used, i.e., water.

The alumina hydrosol is prepared by digesting aluminum in reactive form with aqueous acid of a type which leaves no residue upon subsequent drying and calcination of the extrudate. Procedures for preparing hydrosols in this manner are well known. A typical and preferred procedure is to digest with aqueous acetic acid. By proper adjustment of reactants, it is possible to prepare hydrosols having a pH in the range of about 3 to about 6 and a content of alumina in the range of about 2% to about 15%, by weight, based on the total weight of alumina and water. The particular method of preparation avoids formation of salts which are undesirable in catalyst materials. It is generally preferable to produce a hydrosol having a pH of about 5.5 or lower such as in the range of about 3 to 5. At a pH value of about 6.5 or higher gelation of the hydrosol commences and such values are to be avoided until gelation is actually desired in the process. An upper limit of pH of about 6.0 provides a safe limit against premature gelation which might be occasioned by variations in temperatures and concentrations that might alter the exact pH value at which gelation commences in a given instance. It is also preferred to prepare the alumina hydrosol at an alumina content of 8% to 10%, same basis, for optimum process performance. The hydrosol, having a pH and alumina content in the ranges specified is stable against gelation and is an easily pumpable liquid which can be readily transported by such means.

After the hydrosol has been prepared as described above, it is next purified to remove unreacted aluminum, mercury, if present, and other materials that may not be desired. Such purification comprises a separation of hydrosol from the unwanted materials and may be carried out by any suitable means, such as centrifugation, decantation, filtration, or a combination thereof. Generally, the nature of the separation to be effected is readily carried out because of the pumpable nature of the hydrosol and the distinct natures of the ingredients to be removed. Procedures for purifying the hydrosol are well known and do not require further discussion.

After the hydrosol has been prepared and separated from impurities as described above, the next step in the present process is that of gelation of the purified hydrosol. This is accomplished by the addition of sufficient anhydrous ammonia or ammonium hydroxide to raise the pH of the hydrosol to at least about 7.5. Gelation of the hydrosol by use of anhydrous ammonia or ammonium hydroxide avoids the formation of salts that are substantive or non-volatile during subsequent drying and calcining of the extrudates. Thus, use of both non-substantive or volatile acids and non-substantive or volatile ammonia or ammonium hydroxide are critical to the present process and avoid numerous steps normally associated with salt removal, allow the present process to be carried out directly from hydrosol in continuous and rapid manner, and eliminate property deficiencies in the final extrudates caused by the presence of substantive salts. The pH during gelation may vary from about 7.5 to about 9.5, preferably in the range of 8–9.5. At the lower pH value, the rate of gelation is sufficiently fast to ensure that gelation will be complete before the subsequent shearing step is complete and provides for convenient transport time from addition of ammonia or ammonium hydroxide so that shearing can be run on freshly formed or freshly forming hydrogel. The higher pH value generally results in almost instantaneous gelation of the hydrosol and usually results in complete gelation just prior to the shearing step. Thus, some flexibility with respect to gelation is possible and the pH value can be varied within the range specified to fit the needs of particular processing equipment. Higher pH values are generally unnecessary and are wasteful of ammonia or ammonium hydroxide.

There are several aspects of the gelation step that merit additional discussion. Gelation of the hydrosol causes an increase in viscosity, i.e. the hydrogel being more viscous than the hydrosol from which it is formed. While this viscosity increase is insufficient to provide an extrudable hydrogel, the viscosity increase can adversely affect pumpability of the hydrogel. Consequently, where material transfer by pumping is contemplated, such as in continuous processing, consideration must be given to the increased viscosity. In such instances, it is desirable to control the gelation rate, by suitable pH control, so that gelation is not complete until the hydrogel has been transported to the equipment used to carry out the next step of the present process, i.e. shearing, or so that gelation is completed while the hydrogel is being sheared, thereby minimizing handling of hydrogel of high viscosity. Extensive processing of the viscous hydrogel prior to shearing thereof can have an adverse effect on the extrudability of the subsequently sheared hydrogel and on physical properties of the extrudates ultimately obtained.

Another aspect of the gelation step is the fact that premature gelation of the hydrosol can lead to rheology changes due to ageing. When the hydrogel has been allowed to age sufficiently, the rheological properties of the hydrogel change and the resulting composition upon shearing and extrusion is incapable of retaining its extruded shape under its own weight. Accordingly, it is critical that the hydrogel be promptly sheared and extruded once gelation is effected. Although shearing can be initiated before gelation is complete, complete gelation must occur before shearing is completed. This is because continued gelation beyond the shearing step will adversely affect properties of the ultimate extrudates.

Therefore, in conjunction with the shearing and extruding steps of the present invention, the term "immediately" is employed. As employed herein, this term has the meaning given in Webster's New Collegiate Dictionary, G. and C. Merriam, Publishers, Springfield, Mass., Thin Paper Edition, 1961, page 414, as an adverb of the adjective "immediate" and in the sense of meaning 2 given for said adjective, which states, "Not distant or separated in time or space." Thus, this term refers to the shortest time period, consistent with processing, in which a gelled hydrosol or a sheared and gelled hydrosol can be transferred to the next processing step. Generally, such transfer need require from only a few seconds to a few minutes. The actual time lapse, however, in any case should be before changes in rheological properties of the materials to be processed have begun.

A final aspect with respect to the gelation step of the present process is that, while it is not the rate controlling step of the process, it is necessary to carry out the gelation step such that the rate of gelation coincides with that of the rate of controlling step. In the present process the rate controlling step is the extrusion step. Sheared hydrogel is supplied to the extrusion step at a rate at which extrusion can effectively be carried out. Accordingly, gelling hydrosol or freshly gelled hydrogel should be supplied to the shearing step only as fast as sheared hydrogel exits from the shearing step to the extrusion step. Since the rate at which hydrosol can be prepared and purified can be greatly in excess of the rate at which extrusion can be accomplished and if rate adjustments are necessary among the steps of the process, it is necessary that such adjustments be made prior to the gelation step. That is to say, while it is possible to hold the initial hydrosol or purified hydrosol without adverse effects on the ultimate extrudates, such possibility does not exist with respect to the materials being processed in the subsequent steps. Accordingly, when the feed being supplied to the gelation step is expected to be at a rate which exceeds the rate at which extrusion can be accomplished, it is necessary to reduce the feed rate to the gelation steps. This is readily accomplished by diverting part of the feed back to the supply source by suitable means, such as recycle controls. Thus, just before the purified hydrosol would enter the gelation step, restricted flow is effected and excess purified hydrosol returns to the feed supply without being treated for gelation purposes.

After gelation of the hydrosol has been carried out as described above, the hydrogel forming or formed passes to the shearing step. The shearing or comminution of the hydrogel particles may be conveniently accomplished by passing the hydrogel through a homogenizer, as for example an ordinary spring-pressed or spring-loaded homogenizing valve. In fact, the extent of shearing or comminution may be numerically defined in terms of the pressure drop obtained by passing the hydrogel through a spring-loaded homogenization valve. It has been determined that for the process of the present invention a useful degree of shear will normally be produced by a pressure drop of at least 500 pounds per square inch and preferably at least 1500 pounds per square inch on an ordinary spring-loaded homogenizer, as for example a Manton-Gaulin 15 gallons per hour, 8000 pounds per square inch Laboratory homogenizer. Of course, the desired degree of shearing can be effected by means of other equipment, such as a Waring Blender® (trademark), but for continuous processing a homogenizer is greatly preferred. The proper degree of shear in any case is that amount which produces an extrudate of the hydrogel which will essentially not deform under its own weight as formed. That is to say, the extrudate as formed prior to drying and calcining will retain its shape and enable the drying and calcining steps to be carried out without substantial change in shape. Thus, where the extrudate as initially formed is in rod-like shape, the dried and calcined extrudate will also be of rod-like shape.

After subjecting the hydrogel to the shearing action, the resultant stiffened hydrogel may be then readily extruded as through an orifice of from about $1/16''$ and $1/2''$ diameter. It is generally preferable to extrude the discharge from the homogenizer directly through the orifice using the back pressure of the homogenizer as the driving force for extrusion. Where other equipment is used to perform the shearing steps, suitable pumping means are known whereby extrusion through a suitable extrusion header can be achieved. A particular advantage of the use of the back pressure of the homogenizer to effect extrusion is that a single driving means can be used to carry out the last two process steps and the extrusion is of continuous nature rather than batchwise.

After extrusion, the extrudates are dried and calcined. Care should be exercised in drying, since physical properties of the extrudates depend to a substantial extent upon the drying rate and temperature. Although it is possible to dry the extrudates in a single stage or in multiple stages, it is greatly preferred to use multiple stages. In multiple stages, a first drying step, called "skin-drying" is first carried out to remove most of the surface water and form a dry skin around the extrudate. This first drying is carried out a temperature in the range of about 150–300° F. until the solids content of the extrudate increases numerically from about 2% to 5%, for example from about 8% to about 10–13%. These skin-dried extrudates may be handled and stored without serious breakup of their structure before the final drying step. Final drying is accomplished at a lower temperature than skin-drying, i.e., at a temperature in the range of 100–150° F., preferably about 125° F. Final drying can be accomplished within about 24 hours or until a solids content in the range of about 20–80% is obtained.

After final drying, the extrudate is calcined, typically at temperatures in the range of 1000° F. to 1400° F., according to varying heating schedules, in accordance with conventional procedures for calcination. Generally, a heating schedule which brings the extrudates to a temperature of about 1400° F. in a four hour period are preferred to minimize formation of fines during calcination. The actual heating schedule and temperature have little or no effect on other extrudate properties.

As has been indicated before, when the extrudates are to be used as catalyst materials, it will be appreciated that either the hydrosol may have promoters incorporated therein, or the calcined extrudates may be impregnated with promoters in accordance with procedures well known to those skilled in the art. When the promoters are incorporated into the hydrosol, such presence does not significantly affect the subsequent processing steps in the preparation of extrudates by the process of the present invention.

In using the extrudates as catalysts, they may, depending upon their composition, be employed in fixed or moving bed operations. The catalysts may contain as promoters certain metals or metal oxides which make them especially suitable for catalyzing reactions such as isomerization, hydrogenation, reforming hydrocracking, hydrodesulfurization of petroleum fractions and related materials. Metals and metal oxides which may be used alone or in combination with one or more other metals or their oxides of the type set forth below for particular catalytic purposes are Group I-B metals including copper, silver, and the like; Group V-B metals such as vanadium for use in oxidation reactions, Group VIII metals such as platinum, palladium, rhodium, nickel, cobalt, and the like, transition metal oxides of Group VI such as oxides of chromium, molybdenum, and tungsten; and in the case of hydrocracking and reforming, promoters such as the halogens and in particular chlorine and fluorine.

As is well known, promoters of the general type described above are present in the final catalyst composition in amounts to render them suitable for a particular end use. In general, a promoter or combination of promoters may constitute amounts ranging from about 0.1% to about 20% by weight, based on the weight of the final catalyst composition.

The extrudates prepared by the process of the present invention have superior strength and abrasion resistance and are less prone to producing fines during use and, consequently, less likely to foul catalyst beds than comparable catalysts produced by other processes. Advantageously, the extrudates of the present invention upon attrition, fracture into particles of considerable size rather than to fines, as is the case with comparable catalyst materials prepared by other methods.

The process of the invention with respect to the continuous processing aspects is best illustrated by reference to FIG. 1, which is a flowsheet of a preferred continuous method of carrying out the process. In FIG. 1, digester 1 is used to prepare the hydrosol. Controlled addition of reactive aluminum and dilute aqueous acid are made while vigorously stirring the reaction mixture to effect digestion and hydrosol formation. After sufficient residence time to ensure hydrosol formation, overflow from the digester passes through centrifuge 2 which purifies the hydrosol. From the exit side of the centrifuge, purified hydrosol flows to a feed tank 3 used to supply hydrosol to the remaining steps of the process. The feed tank 3 feeds the Moyno pump 4 which acts as the feed pump for this part of the system. The Moyno pump 4 discharges into the recycle controller 5, which is an air operated diaphragm valve. The recycle controller 5 allows the hydrosol pumped by the Moyno pump 4 which is in excess of the homogenizer capacity to be recycled to the feed tank 3 while, at the same time, maintaining a positive head on the homogenizer feed. A centrifugal pump 6 is directly downstream from the recycle control. The pump plate contains an opening through which ammonium hydroxide can be added. The action of the pump mixes the ammonium hydroxide and hydrosol, and by choice of a pump operating at a low flow rate based on its design capacity, the centrifugal pump 6 generates a large head which, in conjunction with the head supplied by Moyno pump 4, is capable of moving the viscous hydrogel which forms into the homogenizer 7. The ammonium hydroxide is introduced via a pressurized blowcase, through a calibrated rotameter and a fine control valve, to the suction side of the centrifugal pump 6. The thickened hydrogel discharged from the homogenizer 7 is extruded through an extrusion header 8 by the back pressure of the homogenizer 7. The extrudates 9, in the form of rod-like strands are deposited on a moving screen 10 into a first drying oven 11 wherein skin-drying is effected. The skin-dried extrudates are then collected and subsequently subjected to final drying in oven 12 and then subjected to calcination in calciner 13. Final drying and calcination need not form part of the continuous processing because of the fact that time requirements for these steps can place unnecessary restrictions on the production rates of other process steps. Instead, the final drying and calcination steps are conveniently run batchwise using multiple driers and calciners to satisfy production rates, although necessary equipment for continuous processing involving drying and calcining can readily be designed.

The invention is more fully illustrated by the examples which follow, wherein all parts and percentages are by weight unless otherwise specifically designated.

In the following examples, reference is made to physical properties such as pore volume, surface area, and the like. In general, these properties are determined in accordance with Test Methods For Synthetic Fluid Cracking Catalyst, published by American Cyanamid Co., New York, N.Y., 1957. Compact Bulk Density is determined by slowly pouring 100 grams of calcined extrudates into a graduated cylinder placed on a vibrator and the volume determined. This value is equal to the weight of the material divided by the volume determined. Crush strength is determined by placing an extrudate on its side between parallel plates. Force is applied to the top plate by means of pneumatic pressure until the extrudate is crushed. The air pressure in pounds necessary to cause crushing is the crush strength of the extrudate.

EXAMPLE 1

Alumina hydrosol was prepared in a stainless steel reactor having a capacity of 5,000 gallons, internal heating coils, and equipped with an agitator. Amalgamated aluminum was charged to the reactor along with acetic acid and water. The temperature of the reaction was held at 80–90° C. and acid concentration at 2.0–2.8% by weight, based on the total weight of the charge. Addition of effective amounts of anti-foaming agent was made to minimize foaming. A total batch size of approximately 24,000 pounds of hydrosol was produced involving 1,152 pounds of aluminum. The hydrosol was centrifuged and after such purifying treatment, had a content of 7.9% alumina, a pH of 5.5, a specific gravity of 1.08, and a viscosity at 25° C. of 20 centipoises.

A portion of this hydrohol was used to prepare extrudates, entering the hydrosol into the feed tank 3 shown in FIG. 1 and using the balance of the system downstream from feed tank 3 in processing the hydrosol. The homogenizer 7 had an output capacity of 15 gallons per hour. The centrifugal pump 6 was of 2 horsepower motor size. The feed tank was kept agitated with a suitable stirrer. The outlet of the homogenizer was fitted with an extrusion header containing nine stainless steel tubes as outlets, each about 6 inches long and having an inside diameter of 0.180 inch.

Using the apparatus as described, the hydrosol was thus continuously pumped by the Moyno pump 4 from the feed tank 3 through the recycle controller 5 into the suction side of centrifugal pump 6 at a rate of 925 ccs. per minute. Aqueous ammonia (29% $NH_3$ by weight) was also continuously metered into the suction side of the centrifugal pump 6 at the rate of 28 ccs. per minute, thus raising the pH of the hydrosol to 9.3 and causing it to gel practically instantaneously. The resulting gel was thus pumped through the homogenizing valve of homogenizer 7 at a rate of 953 ccs. per minute and at a homogenizing pressure of 2000 pounds per square inch.

The hydrogel upon exiting the homogenizer 7 was extruded through extruder header 8 and emerged as rod-like strands 9 of 0.180 inch diameter and were collected on screen 10 which carried them to the first drying oven 11. The extrudates 9 were stiff enough not to be deformed to any significant extent under their own weight. The extrudates 9 on screen 10 were skin-dried in first drying oven 11 at a temperature of 250° F. for 8 minutes. The skin-dried extrudates were then removed from the screen 10 and collected.

Subsequently, and in batch-wise lots, the extrudates were subjected to final drying at 125° F. for 16 hours in second drying oven 12 and finally calcined in calciner 13 in batchwise lots, starting with a calciner temperature of 70° F. and reaching 1400° F. in 4 hours and then holding at 1400° F. for 1 hour.

Properties of the calcined extrudates are given in Table I, which follows.

COMPARATIVE EXAMPLE A

Another portion of the alumina hydrosol was prepared as extrudates but following the prior art procedure for forming extrudates. The hydrosol was gelled as a batch in a suitable reactor adding sufficient 29% aqueous ammonia to produce a pH of 6.5. The gel obtained was dried by a continuous belt dryer at a temperature of 250° C. to an alumina content of 75%, being placed on the belt in the form of wet strands. The dried gel (a xerogel) was then micropulverized to a powder, 75% of the particles of which passed through a 325 mesh screen and the balance through a 100 mesh screen.

The powder was then mixed with some of the original sol in the ratio of 53 to 47 parts, respectively, using a dough mixer to ensure thorough mixing. The blend obtained was extruded through a die having holes slightly larger than 1/16″ in diameter, and the extrudates were collected on a conveyor. After ageing for about 5 hours at 25° C., the extrudates were dried to 85% solids in a continuous dryer wherein the temperature gradually reached 250° C. over two hours and air circulation was effected by means of fans. The extrudates were then calcined in stages, according to conventional procedures, ultimately being maintained at 1100° F. for one hour. The calcined extrudates were then wet with deionized water and dried in stages at temperatures increasing from 135° C. to 250° C. to an alumina content of 85%. These dried extrudates were then recalcined in stages to a final temperature of 1400° F., which was maintained for one hour. Properties of the calcined extrudates are those listed under xerogel in Table I.

TABLE I

[Extrudate properties]

| Physical property | Extrudate of— | |
|---|---|---|
| | Example 1 | Xerogel |
| Pore volume, cc./gm | .60 | .63 |
| Apparent bulk density, cc./gm | .64 | .63 |
| Compact bulk density, cc./gm | .70 | .69 |
| Surface area, m.²/gm | 247 | 211 |
| Crush strength, lbs | 17.8 | 9.1 |
| Crush strength per unit length, lbs./in | 88 | 56 |
| Diameter, inch | 0.073 | 0.065 |
| Attrition [1] (percent) (ball mill) | 39 | 23 |

[1] Attrition=weight loss in percent on attrition, run at 4 inch Hg pressure drop for 2½ minutes duration, percent minus No. 18 mesh.

The data of Table I indicates that pore volume and density values of the two extrudate types are substantially the same. Surface area of the extrudates of the present invention is about 17% higher than that of the prior art extrudates. Crush strength of the extrudates of the present invention is essentially double that of the prior art extrudates. Crush strength per unit length of extrudates of the present invention is about 60% higher than that of the prior art extrudates. Although there is a loss in diameter from the initial size of the extrudates of the present invention, such loss can be readily attributed to the low solids content of the composition extruded. By proper selection of orifice size of the extruder head and knowledge of the extent of diameter shrinkage as it relates to solids content, it is a simple matter to arrive at final extrudates of desired diameter. As is evident from the other properties, however, diameter shrinkage of the extrudates does not adversely affect other extrudate properties. Attrition values suggest that extrudates of the present invention are somewhat inferior to prior art extrudates in this property. However, as the test is carried out, no attempt is made to distinguish among the particles that pass through an 18 mesh screen. That is to say, the largest particle that passes through an 18 mesh screen is a relatively large particle that does not present problems in a catalyst bed. On the other hand, very small and dusty particles also pass through an 18 mesh screen and cause problems in a catalyst bed. The major portion of particles attrited from extrudates of the present invention are sufficiently close to the 18 mesh particle size so as to minimize problems in a catalyst bed, in spite of the higher attrition value reported. Contrary to this, the major portion of particles attrited from extrudates of the prior art extrudates are of the dusty variety, in spite of the lower attrition values reported. Consequently, the attrition values reported in conformity with standard testing procedures developed for prior art materials are misleading as to which extrudates are apt to cause problems in catalyst beds. Thus, although the extrudates obtained by the specific example of the invention embodied tend to show higher attrition than prior art extrudates, the nature of the attrited material is, in fact, less likely to cause problems in a catalyst bed than is attrited material of the prior art catalyst in spite of the lower portion thereof obtained during the test.

We claim:

1. A process for preparing catalyst material in extrudate form directly from an alumina hydrosol, which process consists essentially of the steps of: (a) preparing a colloidal suspension of alumina by reaction of aluminum with aqueous acid, the amount of alumina in said suspension being in the range of 2% to about 15%, by weight, based on the total weight of alumina and water, and the amount of acid present being sufficient to provide a pH below about 6.0; (b) removing unreacted aluminum and other materials which may be present so as to provide a purified hydrosol; (c) adding sufficient ammonia or ammonium hydroxide to said hydrosol to raise the pH thereof to at least about 7.5 so as to initiate gelation and form a hydrogel composition containing sufficient free water content to be too fluid for extrusion; (d) immediately subjecting the hydrogel composition to shearing to eliminate the fluidizing effect of the free water content present and to produce a stiffened hydrogel composition, complete gelation of said hydrogel composition occurring at least prior to completion of said shearing step; (e) immediately extruding the stiffened hydrogel; and (f) thereafter drying and calcining said extrudates.

2. The process of claim 1 wherein said alumina hydrosol is obtained by digestion of amalgamated aluminum in aqueous acetic acid.

3. The process of claim 1 wherein said colloidal alumina suspension has an alumina content of 8–10%, by weight, based on the total weight of alumina and water.

4. The process of claim 1 wherein the colloidal alumina suspension has a pH in the range of about 3 to 5.

5. The process of claim 1 wherein the amount of ammonia or ammonium hydroxide added to said hydrosol is sufficient to produce a pH in the range of about 8–9.5.

6. The process of claim 1 wherein promoter materials are present in said hydrosol.

7. The process of claim 1 wherein the calcined extrudates are impregnated with promoter materials as an additional step.

8. The process of claim 1 wherein said gelation of the hydrosol is complete prior to said shearing step.

9. The process of claim 1 wherein said gelation of the hydrosol is completed during said shearing step.

10. The process of claim 1 wherein said drying is carried out in multiple steps.

References Cited
UNITED STATES PATENTS

| | | | |
|---|---|---|---|
| 3,390,100 | 6/1968 | Chomitz et al. | 252—463 X |
| 3,634,332 | 1/1972 | Bambrick | 252—463 X |

DANIEL E. WYMAN, Primary Examiner

W. J. SHINE, Assistant Examiner

U.S. Cl. X.R.

423—626

UNITED STATES PATENT OFFICE
CERTIFICATE OF CORRECTION

Patent No. 3,808,153　　　　　Dated April 30, 1974

Inventor(s) Nicholas Chomitz & Norman Ostroff

It is certified that error appears in the above-identified patent and that said Letters Patent are hereby corrected as shown below:

Column 1, line 3, "Shomitz" should be -- Chomitz --.

Column 2, line 10, "entrely" should be -- entirely --.

Column 5, line 57, "a" should be -- at --.

Signed and sealed this 29th day of October 1974.

(SEAL)
Attest:

McCOY M. GIBSON JR.
Attesting Officer

C. MARSHALL DANN
Commissioner of Patents